United States Patent [19]

Fields et al.

[11] 4,215,750

[45] Aug. 5, 1980

[54] HORSESHOE

[76] Inventors: Ronald H. Fields, Hopbine, Roman Rd., Herefordshire; Allan G. McLeod, Elan, The Portway, Burghill, Herefordshire, both of England

[21] Appl. No.: 958,583

[22] Filed: Nov. 7, 1978

[51] Int. Cl.$^2$ .............................................. A01L 1/00
[52] U.S. Cl. ...................................................... 168/4
[58] Field of Search ..................... 168/4, 24; 75/164; 273/73 H

[56] References Cited

U.S. PATENT DOCUMENTS

| | | | |
|---|---|---|---|
| 3,540,946 | 11/1970 | Minton et al. ................... | 75/175.5 X |
| 3,737,290 | 6/1973 | Frehn .............................. | 75/175.5 X |
| 3,780,810 | 12/1973 | Ashton ............................ | 168/4 |
| 4,091,871 | 5/1978 | Chiaramonte et al. ............ | 168/4 |

*Primary Examiner*—Louis G. Mancene
*Attorney, Agent, or Firm*—Caesar, Rivise, Bernstein & Cohen, Ltd.

[57] ABSTRACT

A horseshoe made from a titanium alloy which contains at least 84% titanium and at least 2% aluminium.

6 Claims, No Drawings

HORSESHOE

This invention relates to horseshoes.

According to the invention there is provided a horseshoe made from a titanium alloy which contains at least 84% titanium and at least 2% aluminium.

The invention may be applied to all types of horseshoe, including for example, shoes used for training, racing and jumping. In general, horseshoes made according to the invention will differ in shape and configuration from ordinary horseshoes by virtue of the characteristic relationship of the titanium alloy between its strength and weight.

Conveniently, a horseshoe according to the invention is formed from a blank cut from a straight length of titanium alloy having the necessary ductility, the blank being subsequently bent to the appropriate arcuate shape by cold working, probably by hand. Further cold working may be necessary when fitting the horseshoe to a horse's hoof for a perfect fit and it may also be necessary to heat the horseshoe slightly to assist this fitting. Once in place on the horse's hoof, the normal action of the hoof on the ground as the horse moves will continue cold working, thus strengthening the horseshoe.

The length from which the blank is cut may be formed so that it has a cross-sectional shape commensurate with the use for which the horseshoe is intended, i.e., racing, etc., by for example, rolling, extruding or machining, and suitably spaced nail holes made therein.

Preferably, the titanium alloy contains 6% aluminium. Further elements of the alloy may comprise any one or more of copper, manganese, tin, vanadium, molybdenum, silicon and zirconium, where the content of aluminium is from 2% to 6%, the content of copper is from 0 to 2%, the content of manganese or tin or vanadium respectively or any combination of these three elements is from 0 to 4% but not exceeding that of the aluminium present, the content of molybdenum is from 0 to 4% but not exceeding that of the aluminium present, the content of silicon is from 0 to 5%, and the content of zirconium is from 0 to 5% but not exceeding that of the aluminium present. The total content of elements other than aluminium alloyed with the titanium is preferably from 0 to 10%.

A horseshoe according to the invention may, for example, be made of material according to one of the following specifications.

1. 90% titanium, 6% aluminium, 4% vanadium—commonly known as I.M.I. 318 grade.
2. 88% titanium, 6% aluminium, 0.5% silicon, 0.5% molybdenum, 5% zirconium—commonly known as I.M.I. 685 grade.
3. 84% titanium, 6% aluminium, 5% zirconium, 4% molybdenum, 1% copper—commonly known as I.M.I. 700 grade.
4. 92% titanium, 4% aluminium, 4% manganese—commonly known as I.M.I. 314 grade.
5. 96% titanium, 2% aluminium, 2% manganese—commonly known as I.M.I. 315 grade.
6. 92.5% titanium, 5% aluminum, 2.5% tin—commonly known as I.M.I. 317 grade.
7. 89.5% titanium, 4% aluminium, 4% molybdenum, 0.5% silicon, 2% tin—commonly known as I.M.I. 550 grade.

The elements added to the titanium to make the alloy tend to strengthen the titanium matrix, particularly when the alloy is cold worked, since they are dissolved in the titanium and remain in solution over the range of temperatures to which the horseshoe will normally be subjected when in use.

Without further elaboration the foregoing will so fully illustrate our invention that others may, by applying current or future knowledge, readily adapt the same for use under various conditions of service.

We claim:

1. A horseshoe made from a titanium alloy which contains 88% titanium, 6% aluminium, 0.5% silicon, 0.5% molybdenum and 5% zirconium.

2. A horseshoe made from a titanium alloy which contains 84% titanium, 6% aluminium, 5% zirconium, 4% molybdenum and 1% copper.

3. A horseshoe made from a titanium alloy which comprises 92% titanium, 4% aluminium and 4% manganese.

4. A horseshoe made from a titanium alloy which comprises 96% titanium, 2% aluminium and 2% manganese.

5. A horseshoe made from a titanium alloy which comprises 92.5% titanium, 5% aluminium and 2.5% tin.

6. A horseshoe made from a titanium alloy which comprises 89.5% titanium, 4% aluminium, 4% molybdenum, 0.5% silicon and 2% tin.

* * * * *